United States Patent
Yamashita

(10) Patent No.: US 8,007,005 B2
(45) Date of Patent: Aug. 30, 2011

(54) VEHICLE BODY FRAME STRUCTURE

(75) Inventor: Akihiro Yamashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 12/058,248

(22) Filed: Mar. 28, 2008

(65) Prior Publication Data

US 2008/0238149 A1    Oct. 2, 2008

(30) Foreign Application Priority Data

Mar. 28, 2007  (JP) .................................. 2007-083763

(51) Int. Cl.
*B62D 21/02* (2006.01)
(52) U.S. Cl. .... 280/785; 280/786; 280/788; 296/203.01
(58) Field of Classification Search .................. 280/788, 280/798, 781, 785, 786; 296/203.01
See application file for complete search history.

(56) References Cited

U.S. PATENT DOCUMENTS

| | | | | |
|---|---|---|---|---|
| 6,799,781 | B2 * | 10/2004 | Rasidescu et al. | 280/781 |
| 7,255,191 | B2 * | 8/2007 | Baldwin et al. | 180/220 |
| 7,618,063 | B2 * | 11/2009 | Takeshima et al. | 280/785 |
| 2004/0035624 | A1 * | 2/2004 | Fecteau et al. | 180/210 |
| 2005/0178603 | A1 | 8/2005 | Takeshima et al. | |

FOREIGN PATENT DOCUMENTS

| | | |
|---|---|---|
| CA | 2308987 A1 | 11/2001 |
| JP | 63-170716 A | 7/1988 |
| JP | 8-197967 A | 8/1996 |

* cited by examiner

*Primary Examiner* — Paul N Dickson
*Assistant Examiner* — Timothy Wilhelm
(74) *Attorney, Agent, or Firm* — Westerman, Hattori, Daniels & Adrian, LLP

(57) ABSTRACT

A vehicle body frame structure includes, in a front frame assembly, a front suspension supporting section having paired right and left cushion top end supporting parts, paired right and left upper arm supporting parts, paired right and left upper arm supporting parts, paired right and left lower arm supporting parts, and paired right and left lower arm supporting parts. In the vehicle body frame structure, the front frame assembly has a configuration which is vertically bisected chiefly into an upper front frame and a lower front frame. The upper front frame includes the right and left cushion top end supporting parts. The lower front frame includes the right and left upper arm supporting parts, the right and left upper arm supporting parts, the right and left lower arm supporting parts, and the right and left lower arm supporting parts.

6 Claims, 9 Drawing Sheets

VEHICLE BODY FRAME STRUCTURE

TECHNICAL FIELD

The present invention relates to a vehicle body frame structure of a vehicle having paired right and left wheels.

BACKGROUND OF THE INVENTION

Among vehicle body frame structures of the above-mentioned type, heretofore, there has been a vehicle body frame structure including a frame structure body which has a suspension supporting section (right and left cushion top end supporting parts, right and left upper arm supporting parts, and right and left lower arm supporting parts) for supporting the respective right and left wheels. The frame structure body is configured chiefly of multiple cast parts (frame components) (see Japanese Patent Application Laid-open Publication No. Hei. 08-197967, for example). In this vehicle body frame structure, the frame structure body is composed of two mutually-independent, virtually identical parts—a right and a left cast parts, which are then welded together.

SUMMARY OF THE INVENTION

The conventional-type configuration includes a frame structure body which is laterally bisected, and thus aims at constructing the individual frame components in smaller size without increasing the number of frame components. However, the conventional-type laterally-bisected frame structure body has difficulty in constructing the individual frame components in smaller size. One reason is that upper and lower arm supporting parts in the suspension supporting section extend in the front-rear direction. Another reason is that the cushion-top-end supporting parts have to be formed remotely above the upper arm supporting parts and the lower arm supporting parts. The conventional-type configuration requires many steps to manufacture a frame, which poses another problem. That is because the welding of the mutually-independent right and left frame components of the suspension supporting section requires a well-controlled accuracy between the right and the left components.

In a vehicle body frame structure of a vehicle having paired right and left wheels, it is therefore preferable to divide a frame structure body which has a suspension supporting section into a small number of relatively compact frame components and to reduce the number of steps needed to manufacture a frame. These are some of the objects of the present invention.

To attain the above object, a first aspect of the invention is a vehicle body frame structure for a vehicle (a saddle-type vehicle 1) having paired right and left wheels (for example, front wheels 2 according to an example). The vehicle body frame structure includes a frame structure body (for example, a front frame assembly 41 according to the example) having a suspension supporting section (for example, a front suspension supporting section 41A according to the example) for supporting the right and left wheels, the suspension supporting section including paired right and left cushion top end supporting parts (for example, cushion top end supporting parts 45 according to the example), paired right and left upper arm supporting parts (for example, upper arm supporting parts 46*a* and upper arm supporting parts 46*b* according to the example), and paired right and left lower arm supporting parts (for example, lower arm supporting parts 47*a* and lower arm supporting parts 47*b*). The vehicle body frame structure is characterized in that the frame structure body has a structure which is vertically bisected chiefly into an upper frame component (for example, an upper front frame 42 according to the example) including the right and left cushion top end supporting parts, and a lower frame component (for example, a lower front frame 43 according to the example) including the right and left upper arm supporting parts as well as the right and left lower arm supporting parts.

A second aspect of the invention resides in that the lower frame component includes an upper beam part (for example, an upper beam part 43*a* according to the example) and a lower beam part (for example, a lower beam part 43*b* according to the example). The upper beam part includes the right and left upper arm supporting parts and extends in the front-rear direction. The lower beam part includes the right and left lower arm supporting parts and extends in the front-rear direction.

A third aspect of the invention resides in that the upper beam part and the lower beam part are included, and the upper and lower beam parts are partially connected to each other by use of columnar parts (for example, front and rear columnar parts 43*c* and 43*d* according to the example).

A fourth aspect of the invention resides in that the frame structure body includes an engine supporting part (for example, front engine supporting part 49*c* according to the example).

A fifth aspect of the invention resides in that the frame structure body includes a steering supporting part (for example, a lower steering supporting part 59 according to the example).

A sixth aspect of the invention resides in that the frame structure body includes vehicle accessory supporting parts (for example, a front upper tank supporting part 72*a*, a lower tank supporting part 74 and a lower radiator supporting part 78 according to the example).

The first aspect of the invention makes it possible to construct the individual components in a smaller size without increasing the number of frame components, by providing the upper frame component, including the cushion top end supporting parts which are separated from each other progressively widely toward their top ends, as a member separated from the lower frame component including the right and left upper arm supporting parts as well as the right and left lower arm supporting parts. In addition, the first aspect of the invention makes it possible to easily manage precisions respectively of the right and left parts of the suspension supporting section, and to reduce the number of steps needed to manufacture a frame by providing the monolithic upper frame component with the right and left cushion top end supporting parts, and by providing the monolithic lower frame component with the right and left upper arm supporting parts as well as the right and left lower arm supporting parts.

The second and third aspects of the invention make it possible to construct a light-weight lower front frame component while securing the rigidity for the lower front frame component.

The fourth to sixth aspects of the invention make it possible to simplify the structure for supporting the parts.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
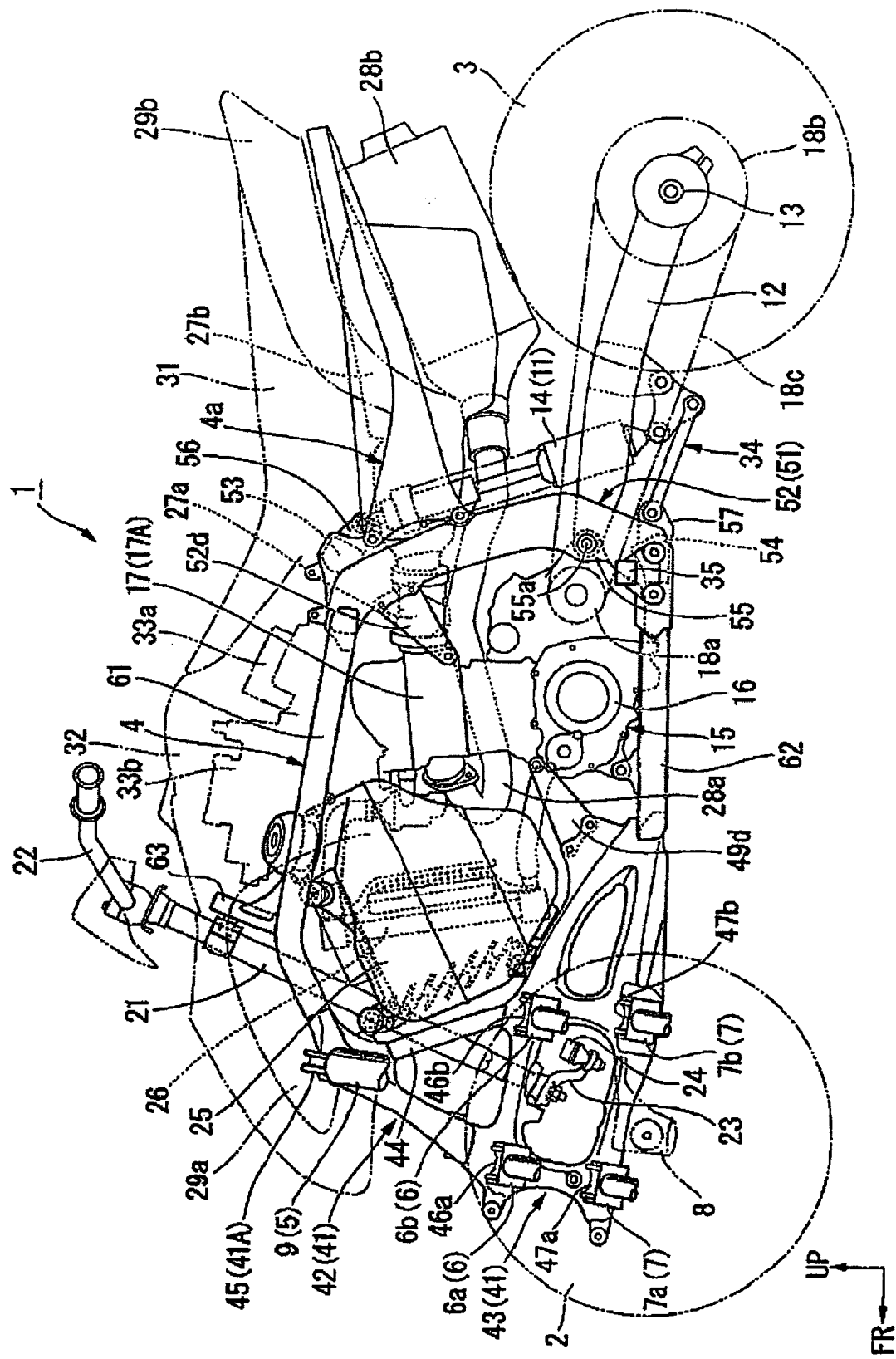
FIG. 1 is a left side view of a saddle-type vehicle according to an example of the present invention.

Descriptions will be provided hereinbelow for an example of the present invention with reference to the drawings. In the following descriptions, front, rear, right and left are used to refer to the front, rear, right and left side or part of a vehicle unless otherwise indicated. In the drawings, an arrow FR points in the frontward direction, an arrow LH points in the left-hand direction, and an arrow UP points in the upward direction.

A saddle type vehicle 1 shown in FIG. 1 has a pair of front wheels 2 and a pair of rear wheels 3, which are low-pressure balloon tires each with a relative large diameter, at the front and rear sides of its small-sized and light-weight vehicle body. The saddle type vehicle 1 is what is termed as an ATV (All-Terrain Vehicle) having a higher capability of running in rough terrains by exploiting its large ground clearance. A vehicle body frame 4 of the saddle type vehicle 1 is formed of multiple types of aluminum alloy materials which are connected to one another in an integrated manner by welding or the like. In a front section of the center of the vehicle body in the right-left direction, the vehicle body frame 4 is formed in a box structure with its front-rear sides being longer than the right-left sides (see FIGS. 2 and 3). Front end parts of a seat frame 4a extending in the front-rear direction is connected to the respective upper rear end parts of the vehicle body frame 4 by bolt fastening or the like in an integrated manner.

Double wishbone (independent) front suspensions 5 are supported by front parts of the vehicle body frame 4, and right and left front wheels 2 are suspended from the front parts of the vehicle body with the front suspensions 5 interposed in between, respectively. The front suspensions 5 are formed chiefly of paired right and left upper arms 6, right and paired left lower arms 7, paired right and left knuckles 8, paired right and left front cushions 9, respectively. The right and left upper arms 6 as well as the right and left lower arms 7 are connected to the right and left sides of a lower front part of the vehicle body frame 4 in a way that the base end parts of the front suspensions 5 are capable of swinging in upward and downward directions, respectively. Each of the left and right knuckles 8 is supported by a front end part of a corresponding one of the upper arms 6 and a corresponding one of the lower arms 7. Right and left front cushions 9 are interposed between their corresponding upper arms 6 (or their corresponding lower arms 7) and the vehicle body frame 4. The right and left front wheels 2 are pivotally supported by the right and left knuckles 8, respectively.

On the other hand, swing arm (rigid axle) rear suspension 11 is supported by a rear part of the vehicle body frame 4. The right and left rear wheels 3 are suspended from the respective rear parts of the vehicle body by use of the rear suspension 11. The rear suspension 11 is formed chiefly of a swing arm 12, a rear wheel axle 13 and a rear cushion 14. The swing arm 12 is connected to a lower rear end part of the vehicle body frame 4 in a way that its base end part is capable of swinging in upward and downward directions. The rear wheel axle 13 is supported by a rear end part of the swing arm 12. The single rear cushion 14 is interposed between the swing arm 12 and the vehicle body frame 4. The right and left rear wheels 3 are pivotally supported by the two ends of the rear wheel axle 13.

As a motor of the saddle type vehicle 1, an engine 15 is mounted in a rear inside of the vehicle body frame 4. The engine 15 is, for example, a water-cooled single-cylinder engine having a crank shaft extending in the vehicle-width (right-left) direction. The engine 15 has a cylinder 17A which is installed virtually upright above a crank case 16 constituting the lower part of the engine 15. Incidentally, reference numeral 17 in the drawing denotes a cylinder head. A driving sprocket 18a is arranged in a rear left part of the crank case 16. An endless driving chain 18c is hooked around the driving sprocket 18a and a driven sprocket 18b arranged in the middle part of the rear wheel axle 13.

A steering shaft 21 is arranged in a front part of the vehicle body frame 4 at the center between the right and left sides thereof in a way that the steering shaft 21 tilts so that the upper portion of the steering is positioned rearward. A bar-type steering handle 22 is attached to the top end part of the steering shaft 21 in an integrated manner. A pitman arm 23 functioning as a steering mechanism is attached to the bottom end part of the steering shaft 21 in an integrated manner. The pitman arm 23 extends rearward from the bottom end part of the steering shaft 21. Base end parts of right and left tie rods 24 are connected to the extremity parts of the pitman arm 23, respectively. Extremity parts of the right and left tie rods 24 are connected to the right and left knuckles 8, respectively.

Incidentally, in the drawings, a fuel tank reference numeral 25 denotes a fuel tank arranged on the left side in a middle part between the front and rear part of the vehicle body frame 4; reference numeral 26 denotes a radiator arranged on the right side in the middle part between the front and rear part of the vehicle body frame 4; reference numerals 27a and 27b denote a throttle body and air cleaner case of an engine air intake system, respectively; reference numerals 28a and 28b denote an exhaust pipe and a muffler of an engine exhaust system, respectively; reference numerals 29a and 29b denote a front fender covering an upper outer periphery of the front wheel 2 and a rear fender covering the upper outer periphery of the rear wheel 3, respectively; reference numeral 31 denotes a saddle type seat supported by the top of the seat frame 4a; reference numeral 32 denotes a vehicle body cover chiefly covering a front side of an upper part of the vehicle body; reference numerals 33a and 33b denote a battery and various electrical units accommodated in the vehicle body cover 32 between the saddle type seat 31 and the steering shaft 21, respectively; reference numeral 34 denotes a link mechanism connecting a bottom end part of the rear cushion 14 to the swing arm 12 and the vehicle body frame 4; and reference numeral 35 denotes a right and left steps for a driver.

Figure 2:
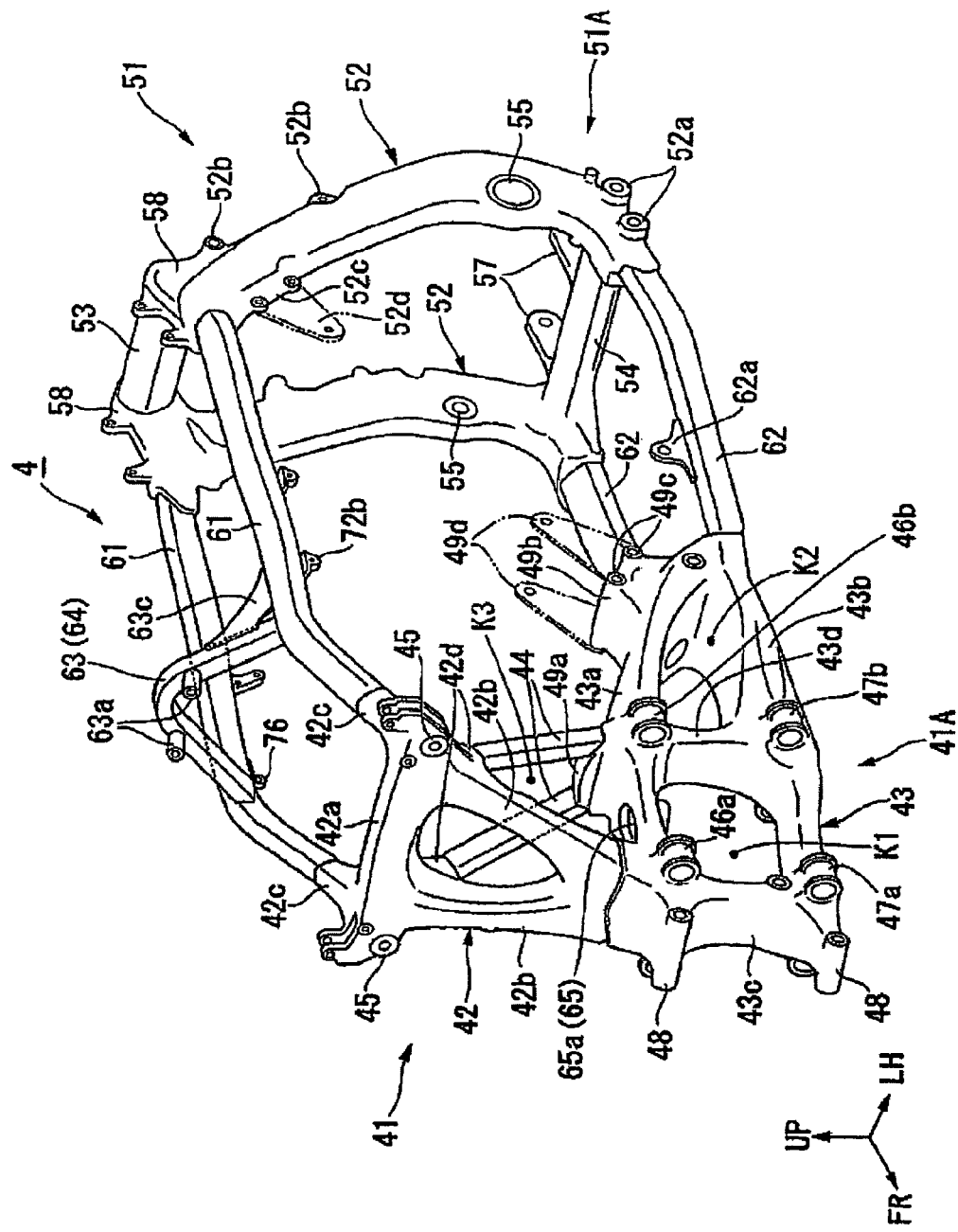
FIG. 2 is a perspective view of a vehicle body frame of the saddle-type vehicle, which is viewed from a left front upper side.
Figure 3:
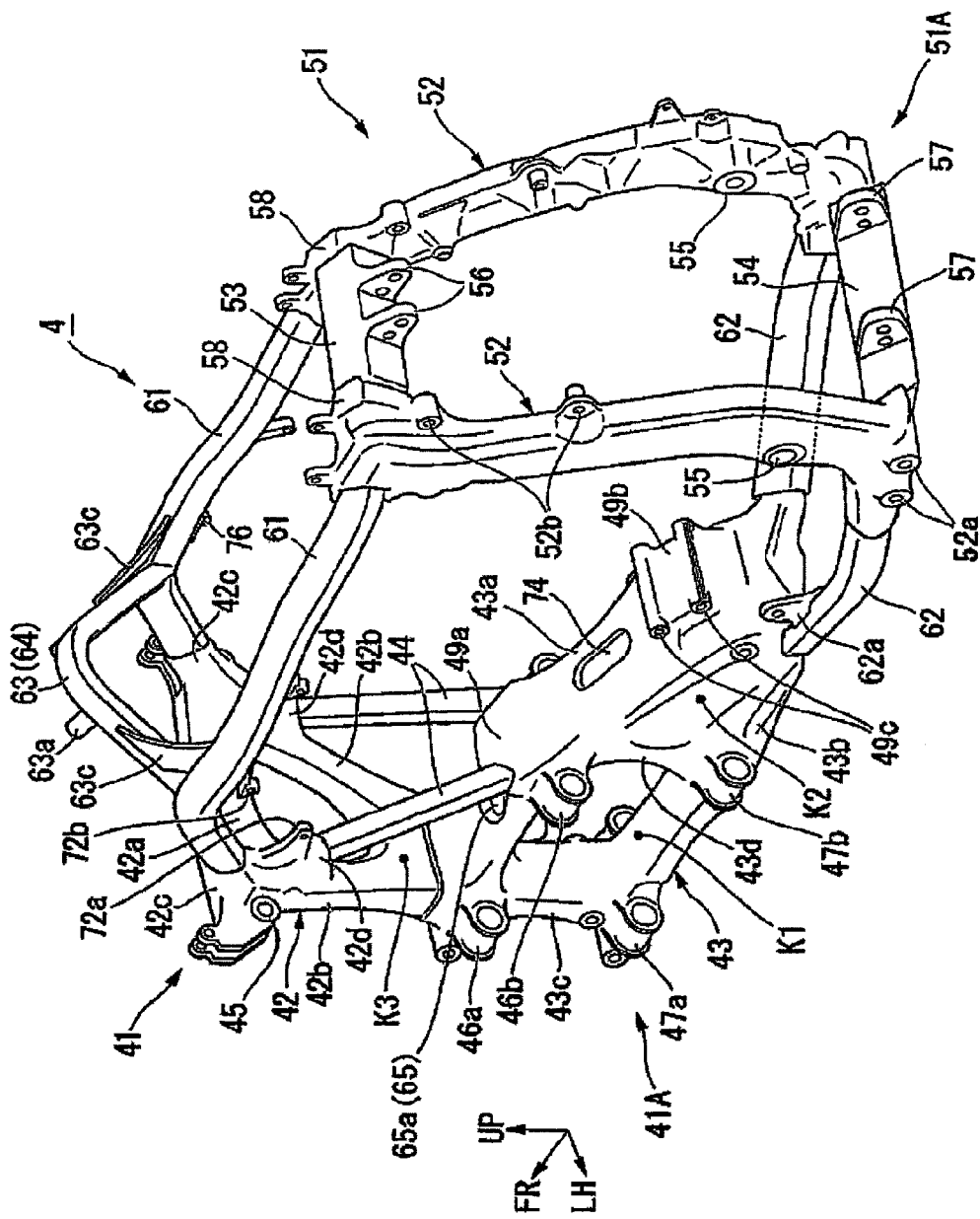
FIG. 3 is a perspective view of the vehicle body frame, which is viewed from a left rear upper side.

As shown in FIGS. 2 and 3, the vehicle body frame 4 includes: a front frame assembly 41 having a front suspension supporting part 41A; a center frame assembly 51 having a rear suspension supporting part 51A; paired right and left upper connecting pipes 61 and paired right and left lower connecting pipes 62.

Figure 4A:
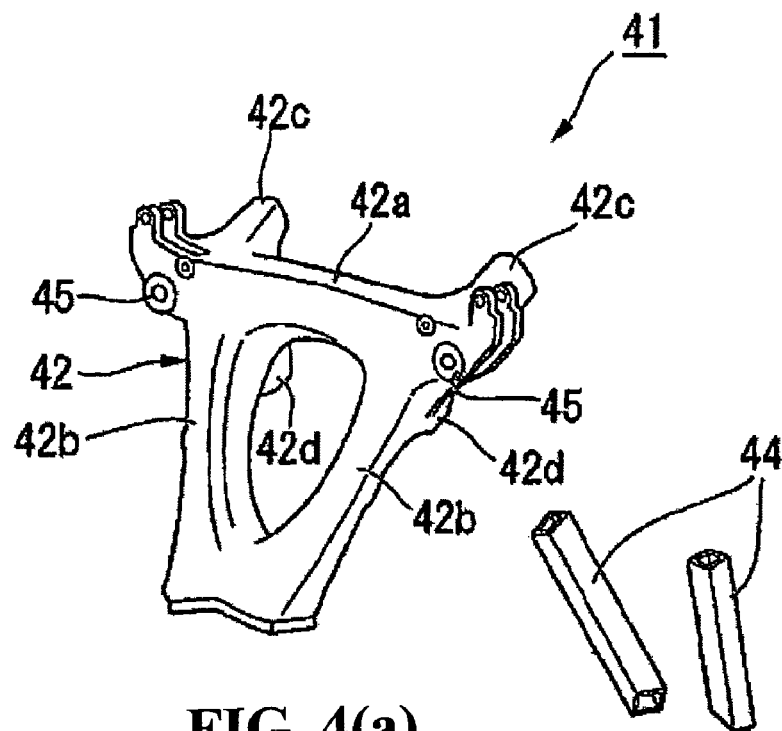
FIG. 4 is an exploded perspective view of a front frame assembly of the vehicle body frame.
Figure 4B:
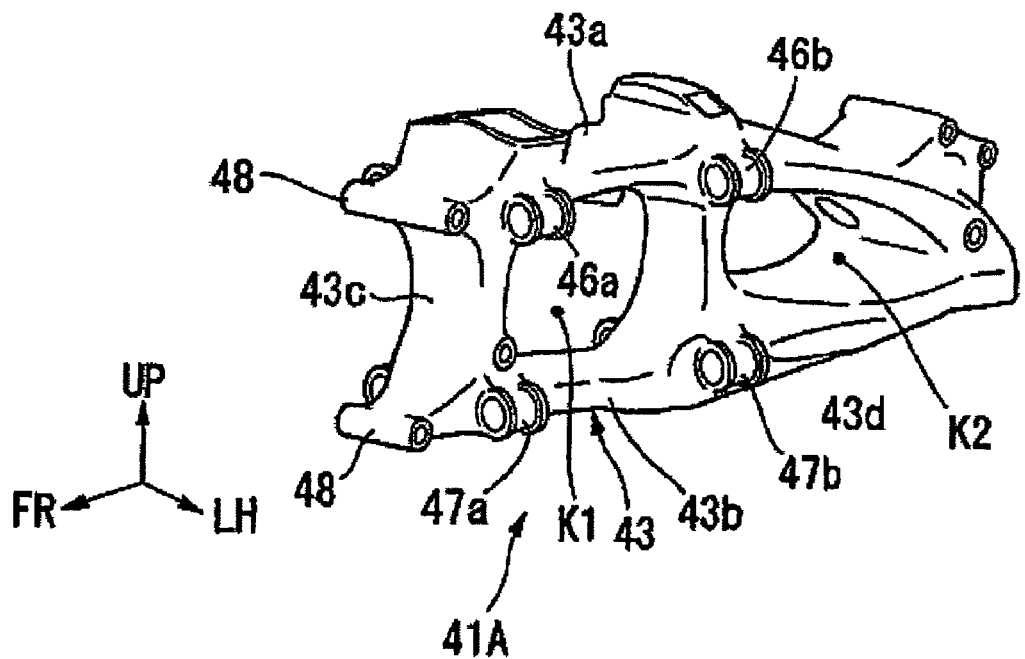

The front frame assembly 41 has a configuration which is virtually vertically bisected into an upper front frame 42 and a lower front frame 43 (see FIG. 4). The upper front frame 42 includes paired right and left cushion top end supporting parts 45 in the front suspension supporting part 41A. The lower front frame 43 includes paired right and left front upper arm supporting parts 46a, paired right and left rear upper arm supporting parts 46b, paired right and left front lower arm supporting parts 47a, and paired right and left rear lower arm supporting parts 47b in the front suspension supporting part 41A. Pai red right and left gusset pipes 44 are bridged between a rear part of the upper front frame 42 and a rear part of the lower front frame 43.

On the other hand, the center frame assembly 51 includes: paired right and left center frames 52 having the respective swing arm pivot parts 55 in the rear suspension supporting section 51A; an upper cross member 53 having cushion top end supporting parts 56 in the rear suspension supporting section 51A; and a lower cross member 54 having link mechanism supporting part 57 in the rear suspension supporting section 51A.

The right and left upper connecting pipes 61 extend in the front-rear direction between the two sides of a top end part of the front frame assembly 41 (the two sides of a top end part of the upper front frame 42) and the two sides of a top end part of the center frame assembly 51 (top end parts of the right and left center frames 52), respectively. Front end parts of the respective right and left upper connecting pipes 61 are connected to the front frame assembly 41 by welding, whereas rear end parts of the respective right and left upper connecting pipes 61 are connected to the center frame assembly 51 by welding. A single top pipe 63 is bridged between front parts of the respective right and left upper connecting pipes 61.

In addition, the right and left lower connecting pipes 62 extend in the front-rear direction between the two sides of a lower rear end part of the front frame assembly 41 (the two sides of a rear end part of the lower front frame 43) and the two sides of a bottom end part of the center frame assembly 51 (bottom end parts of the right and left center frames 52), respectively. The front end parts of the respective right and left lower connecting pipes 62 are connected to the front frame assembly 41 by welding, whereas rear end parts of the respective right and left lower connecting pipes 62 are connected to the center frame assembly 51 by welding.

Each of the upper and lower front frames 42 and 43 is a monolithic cast aluminum part, whereas each of the right and left center frames 52 as well as each of the upper and lower cross members 53 and 54 is a monolithic forged aluminum part. However, each of the upper and lower front frames 42 and 43 may be a monolithic forged aluminum part, whereas each of the right and left center frames 52 as well as each of the upper and lower cross members 53 and 54 may be a monolithic cast aluminum part. Otherwise, each of the upper and lower front frames 42 and 43, the right and left center frames 52, and the upper and lower cross members 53 and 54 may be a monolithic cast or forged aluminum part.

On the other hand, each of the connecting pipes 61 and 62, the top pipe 63, and the gusset pipes 44 is a part made by doing things such as bending an extruded aluminum material. However, a part or all of each of the connecting pipes 61 and 62, the top pipe 63, and the gusset pipes 44 may be a monolithic cast or forged aluminum part.

As shown in FIG. 4 in addition to FIGS. 2 and 3, the front frame 42 includes: an upper hem part 42a extending in the right-left direction; and right and left side hem parts 42b extending downward from the two respective end parts of the upper hem parts 42a. As a result, the front frame 42 is formed to look like an inverted triangle when viewed from the front. The upper front frame 42 is arranged in a direction parallel to the right-left direction. The upper front frame 42 is arranged to tilt so that the upper portion thereof is positioned rearward when viewed from the side. The cushion top end supporting parts 45, which project out rightward and leftward, are formed in the two sides of the top end part of the upper front frame 42 in an integrated manner, respectively. The right and left cushion top end supporting part 45 respectively constitute front-rear walls parallel to each other. Top end parts of the front cushions 9 are inserted between the front-rear walls. The top end parts thereof are swingably connected to the right and left top end supporting parts 45 by use of connecting shafts tilting slightly rearward, respectively.

Upward extending parts 42c and downward extending parts 42d are formed in the two sides of a top end rear part of the upper front frame 42 in an integrated manner. Each of the upper extending parts 42c extends diagonally upward and rearward. Each of the downward extending parts 42d extends diagonally downward and rearward under its corresponding one of the upper extending parts 42c. Front end parts of the upper connecting pipes 61 are connected to extremity parts of the right and left upward extending parts 42c by welding, respectively. Top end parts of the gusset pipes 44 are connected to extremity parts of the right and left downward extending parts 42d by welding, respectively.

The lower front frame 43 includes: upper and lower beam parts 43a and 43b; and front and rear columnar parts 43c and 43d. The upper and lower beam parts 43a and 43b extend in the front-rear direction. The front columnar part 43c connects a front end part of the upper beam part 43a to a front end part of the lower beam part 43b in an integrated manner. The rear columnar part 43d connects a middle part between the front and rear parts of the upper beam part 43a and a middle part between the front and rear parts of the lower beam part 43b in an integrated manner. The upper and lower beam parts 43a and 43b are arranged to tilt rearward and downward. The upper beam part 43a is provided to look like an upward-convex curve when viewed from the side. The lower beam part 43b is provided to look like a straight line when viewed from the side.

Front halves respectively of the upper and lower beam parts 43a and 43b are arranged virtually in parallel to each other. A rear half of the upper beam part 43a tilts rearward and downward, and thus a rear end part thereof is integrated into an upper side of a rear end part of the lower beam part 43b in a way that the rear end part thereof is merged with the lower beam part at an acute angle when viewed from the side. In addition, because the front end parts respectively of the upper and lower beam parts 43a and 43b are connected by the front columnar part 43c, whereas the middle part between the front and rear parts of the upper beam part 43a and the middle part between the front and rear parts of the lower beam part 43b are connected by the rear columnar part 43d, the front and rear end parts as well as the middle between the front and rear parts of the lower front frame 43, which is long in the front-rear direction, are integrated and have a high rigidity. In addition, a front space part K1 which penetrates a part of the lower front frame 43 in the right-left direction is formed between the front halves respectively of the upper beam part 43a and the lower beam part 43b, whereas a rear space part K2 which penetrates another part of the lower front frame 43 in the right-left direction is formed between the rear halves respectively of the upper beam part 43a and the lower beam part 43b. This contributes to the light weight of the lower front frame 43. Incidentally, reference numeral 48 in the drawing denotes a supporting part for a carry pipe, which is not illustrated.

Each of the upper beam part 43a and the lower beam part 43b extends in a flat shape, whose right-left width is larger than the top-bottom thickness, in the front-rear direction. Each of the front and rear columnar parts 43c and 43d extends in a flat shape, whose right-left width is larger than the front-rear thickness, in the upward-downward direction. The top end parts and the bottom end parts of each of the front columnar part 43c and the rear columnar part 43d have a progressively larger front-rear thickness toward their ends. This checks stress concentration which would otherwise occur in the connecting parts between the front columnar part 43c and the upper beam part 43a, between the front columnar part 43c and the lower beam part 43b, between the rear columnar part 43d and the upper beam part 43a, and between the rear columnar part 43d and the lower beam part 43b. In addition, the lower front frame 43 is provided in a way that its right-left width increases progressively slightly toward the rear end.

The front upper arm supporting parts 46a, which project out rightward and leftward, are formed in the two sides of the front end part of the upper beam part 43a in an integrated manner, respectively. The rear upper arm supporting parts 46b, which project out rightward and leftward, are formed in the two sides of the middle part between the front and rear parts of the upper beam parts 43a in an integrated manner, respectively. The upper arm supporting parts 46a and 46b tilt slightly downward and rearward, and are each shaped like a cylinder. The right front upper arm supporting part 46a and the right rear upper arm supporting part 46b are provided coaxially, and the left front upper arm supporting part 46a and the left rear upper arm supporting part 46b are provided coaxially. A front connecting part 6a in the base end part of the upper arm 6 is installed in the upper arm supporting parts 46a, the front connecting part 6a looking like a letter U when viewed from the above. A rear connecting part 6b is installed in the upper arm supporting parts 46b, the rear connecting part 6b looking like a letter U when viewed from the above. The front connecting part 6a and the rear connecting part 6b are swingably connected by use of a connecting shaft tilting slightly downward and rearward.

The front lower arm supporting parts 47a, which project out rightward and leftward, are provided to the two sides of the front end part of the lower beam part 43b in an integrated manner, respectively. The rear lower arm supporting parts 47b, which project out rightward and leftward, are provided to the two sides of the middle part between the front and rear parts of the lower beam part 43b in an integrated manner, respectively. The lower arm supporting parts 47a and 47b tilt slightly downward and rearward. The right front lower arm supporting part 47a and the right rear lower arm supporting part 47b are respectively shaped like coaxial cylinders, and the left front lower arm supporting part 47a and the left rear lower arm supporting part 47b are respectively shaped like coaxial cylinders. A front connecting part 7a in the base end part of the lower arm 7 is installed in the lower arm supporting parts 47a, the front connecting part 7a looking like a letter U when viewed from the above. A rear connecting part 7b is installed in the lower arm supporting parts 47b, the rear connecting part 7b looking like a letter U when viewed from the above. The front connecting part 7a and the rear connecting part 7b are swingably connected by use of a connecting shaft tilting slightly downward and rearward.

A bottom end part of each of the front cushions 9 is swingably connected to a corresponding one of the upper arms 6 (or the lower arms 7) by use of a connecting shaft tilting slightly downward and rearward. In addition, the connecting shafts in the top and bottom ends of each of the front cushions 9 are parallel to the connecting shaft of the base end part of a corresponding one of the upper arms 6 and the connecting shaft of the base end part of a corresponding one of the lower arms 7.

A front seat part 49a, which protrudes upward, is provided to an upper side of the front end part of the upper beam part 43a in an integrated manner. A bottom end part of the upper front frame 42 is connected to the top of the front seat part 49a by welding. A rear seat part 49b, which protrudes upward, is formed in an upper side of the middle part between the front and rear parts of the upper beam part 43a. Bottom end parts respectively of the right and left gusset pipes 44 are connected to the top of the rear seat part 49b by welding.

Each of the right and left gusset pipes 44 is formed of a linear square bar. The gusset pipes 44 are arranged to tilt so that their upper portions are positioned frontward when viewed from the side, and to tilt so that one of their upper portions is positioned outward and rightward and the other of their upper portions is positioned outward and leftward when viewed from the front. The right gusset pipe 44 is bridged between the right downward extending part 42d of the front frame 42 and the right side of the rear seat part 49b of the lower front frame 43, whereas the left gusset pipe 44 is bridged between the left downward extending part 42d of the front frame 42 and the left side of the rear seat part 49b of the lower front frame 43. Incidentally, the right-left width of the front part of the vehicle body frame 4 becomes progressively wider toward the upper part thereof.

At this time, each of the gusset pipes 44, the upper front frame 42, and the front half of the upper beam part 43a are arranged to constitute a virtual equilateral triangle when viewed from the side. An upper space part K3, which penetrates the front frame assembly 41 in the right-left direction, is formed among each of the gusset pipes 44, the upper front frame 42, and the front half of the upper beam part 43a. This causes the upper part of the front frame assembly 41 to have a larger rigidity and a lighter weight.

In addition, because the upper front frame 42 and the front columnar 43c are connected to each other in a line when viewed from the side, and because each of the gusset pipes 44 and the rear columnar part 43d are connected to each other in a line when viewed from the side, a crossover part between the front part of the front frame assembly 41, whose front part extends in the upward-downward direction, and the lower part (the lower front frame 43) of the front frame assembly 41, whose lower part extends in the front-rear direction, is provided in a rigid manner.

A front engine supporting part 49c, which is shaped like a trapezoid when viewed from the side, and which protrudes diagonally upward and rearward, is formed in an upper side of the rear end part of the upper beam part 43a in an integrated manner. Base end parts of paired right and left front engine supporting plates 49d are connected to the right and left sides of the engine supporting part 49c by bolt fastening or the like, respectively. Extremity parts of the front engine supporting plates 49d are connected to an upper side of a front end part of the crank case 16 of the engine 15 by bolt fastening or the like. In other words, the upper side of the front end part of the crank case 16 of the engine 15 is supported by the front engine supporting part 49c of the lower front frame 43 by use of the right and left front engine supporting plates 49d.

It should be noted that, in addition to the upper side of the front end part of the crank case 16 of the engine 15 being supported by the front engine supporting part 49c of the lower front frame 43, lower sides of the front end part of the crank case 16 of the engine 15 are supported by front parts of the right and left lower connecting pipes 62 by use of engine supporting brackets 62a, respectively. Furthermore, rear parts of the cylinder head 17 of the engine 15 are supported by upper parts of the right and left center frames 52 by use of right and left rear engine supporting plates 52d, respectively. Moreover, rear end parts of the crank case 16 of the engine 15 are supported by swing arm pivot parts 55 arranged in lower parts of the right and left center frames 52 by use of a pivot shaft 55a, respectively (see FIG. 1).

The mirror-imaged right and left center frames 52 extend in the upward-downward direction at a location rearward of a middle part between the front and rear part of the vehicle body. Right and left upper connecting pipes 61 are welded to the right and left center frames 52 respectively. The rear end of each upper connecting pipe 61 is connected to the front side of the top end part of the corresponding center frame 52. Member supporting parts 58, which protrude rearward, are formed in rear sides of top ends of the right and left center frames 52 in an integrated manner, respectively. End parts of the upper cross member 53 are respectively connected to an inner side of the right member supporting part 58 and an inner side of the left member supporting part 58 by welding. The cushion top end supporting parts 56, which protrude rearward, are formed in a rear side of a middle part between the right and left ends of the upper cross member 53 in an integrated manner.

The bottom end parts of the right and left center frames 52 are curved and thereafter extended frontward. Rear end parts of right and left lower connecting pipes 62 are connected to front end parts of the curved bottom end parts of the right and left center frames 52 by welding, respectively. End parts of the lower cross member 54 are respectively connected to an inner side of the bottom end part of the right center frame 52 and an inner side of the bottom end part of the left center frame 52 by welding. The link mechanism supporting parts 57, which protrude rearward, are formed in rear sides of a middle part between the right and left ends of the lower cross member 54 in an integrated manner. Incidentally, step supporting parts 52a, which support the steps 35, are provided to the right and left outsides of the bottom end parts of the right and left center frames 52, respectively. Seat frame supporting parts 52b, which support front end parts of the seat frame 4a, are provided to rear sides of upper parts of the right and left center frames 52. Rear engine supporting parts 52c, which support the engine 15 by use of rear engine supporting plates 52d, are provided to front sides of the upper parts of the right and left center frames 52, respectively.

The swing arm pivot parts 55 are provided to the lower parts of the right and left center frames 52, respectively. Front end parts of the swing arm 12 are supported by the swing arm pivot parts 55 by use of the pivot shaft 55a, which extends through the swing arm pivot parts 55 in the right-left direction, so that the swing arm 12 is capable of swinging in the upward-downward direction.

It should be noted that the center frame assembly 51 is formed in a way that the right-left width of the upper part thereof is slightly narrower so that the center frame assembly 51 looks like a trapezoid when viewed from the rear. The right and left lower connecting pipes 62 are provided to tilt so that they are separated from each other progressively widely toward the rear end part when viewed from the above, and to be virtually horizontal when viewed from the side. In addition, the right and left upper connecting pipes 61 are provided to extend virtually in the front-rear direction when viewed from the above, and are curved in a way that their respective front parts tilt upward and rearward, whereas their respective rear parts are virtually horizontal, when viewed from the side.

The top pipe 63 is curved to be concave upward when viewed from the front, and thus a middle part between the right and left end parts of the top pipe 63 protrudes above the upper connecting pipes 61, when viewed from the front. Right and left bosses 63a are provided in a protruding manner to front sides of the middle part between the right and left end parts of the top pipe 63. Front and rear half members 63b are attached to the right and left bosses 63a by bolt fastening. An upper outer peripheral surface of the steering shaft 21 is rotatably supported by an inside surface of a cylinder constituted of the front and rear half members 63b. In other words, the upper steering supporting part 64, which rotatably supports an upper part of the steering shaft 21, is formed chiefly of the top pipe 63, the right and left bosses 63a, and the front and rear half members 63b. Incidentally, reference numeral 63c in the drawing denotes a right gusset plate installed between a right rear part of the top pipe 63 and an upper part of the right upper connecting pipe 61, and a left gusset plate installed between the left rear part of the top pipe 63 and an upper part of the left upper connecting pipe 61.

A lower steering supporting part 65, which rotatably supports a lower part of the steering shaft 21, is provided to the front half of the lower beam part 43b. The lower steering supporting part 65 has a shaft insertion hole 65a which penetrates the upper beam part 43a from the top to the bottom, and rotatably supports the lower part of the steering shaft 21 in the shaft insertion hole 65a. The lower part of the steering shaft 21 protrudes downward from the lower steering supporting part 65 (into the front space part K1), and the pitman arm 23 of the steering mechanism is attached to the bottom part of the steering shaft 21. In other words, the front space part K1 is also a space in which to arrange the steering mechanism. Incidentally, reference numeral 65b in the drawing denotes a handle stopper which is provided to a lower part of the upper beam part 43a in a protruding manner. The handle stopper 65b restricts a maximum rotational angle of the steering shaft 21 (a maximum steering angle of the steering handle 22) by abutting on the pitman arm 23 while the steering shaft 21 is being rotated.

Figure 5:
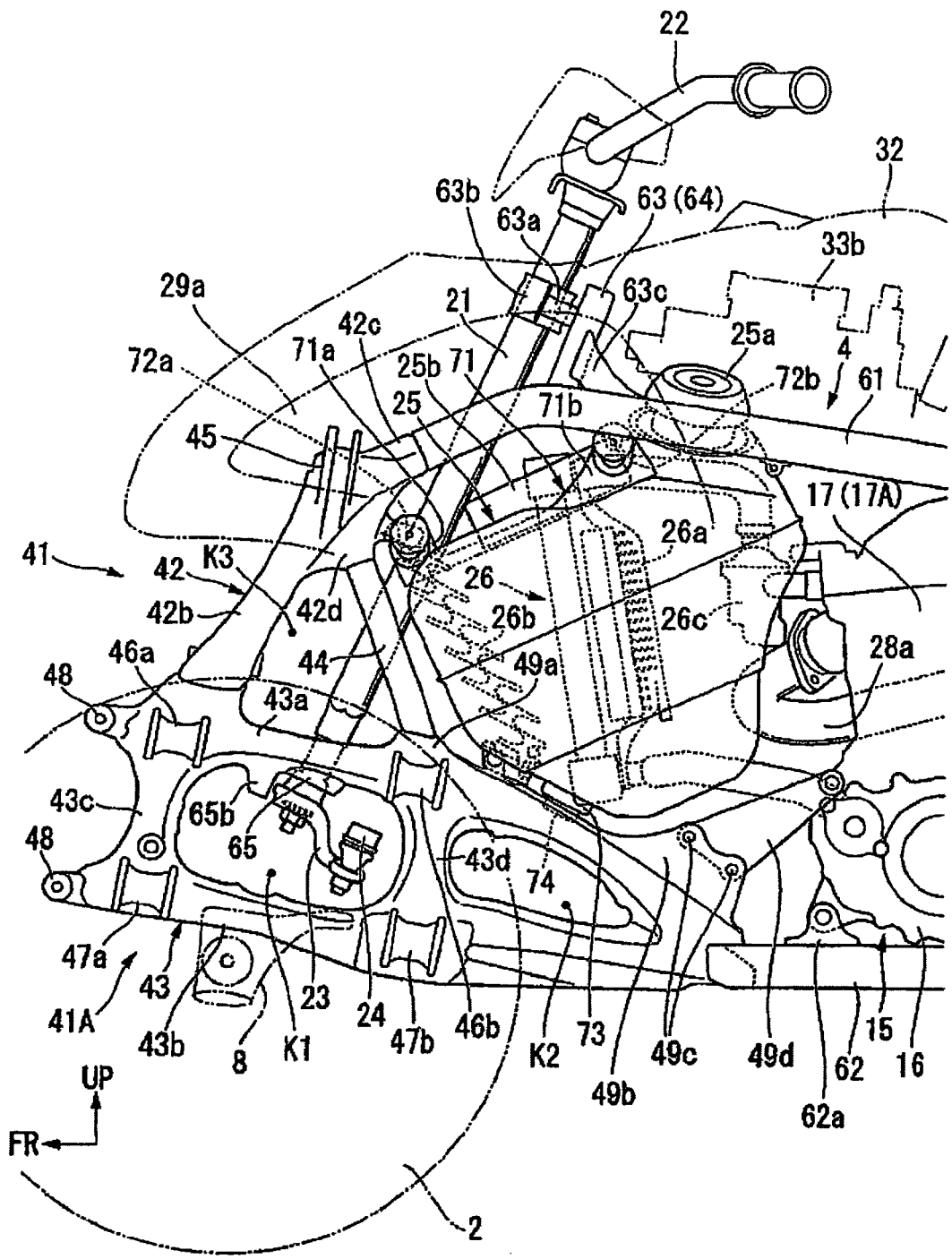
FIG. 5 is a left side view of a front part of a vehicle body of the saddle-type vehicle.
Figure 6:
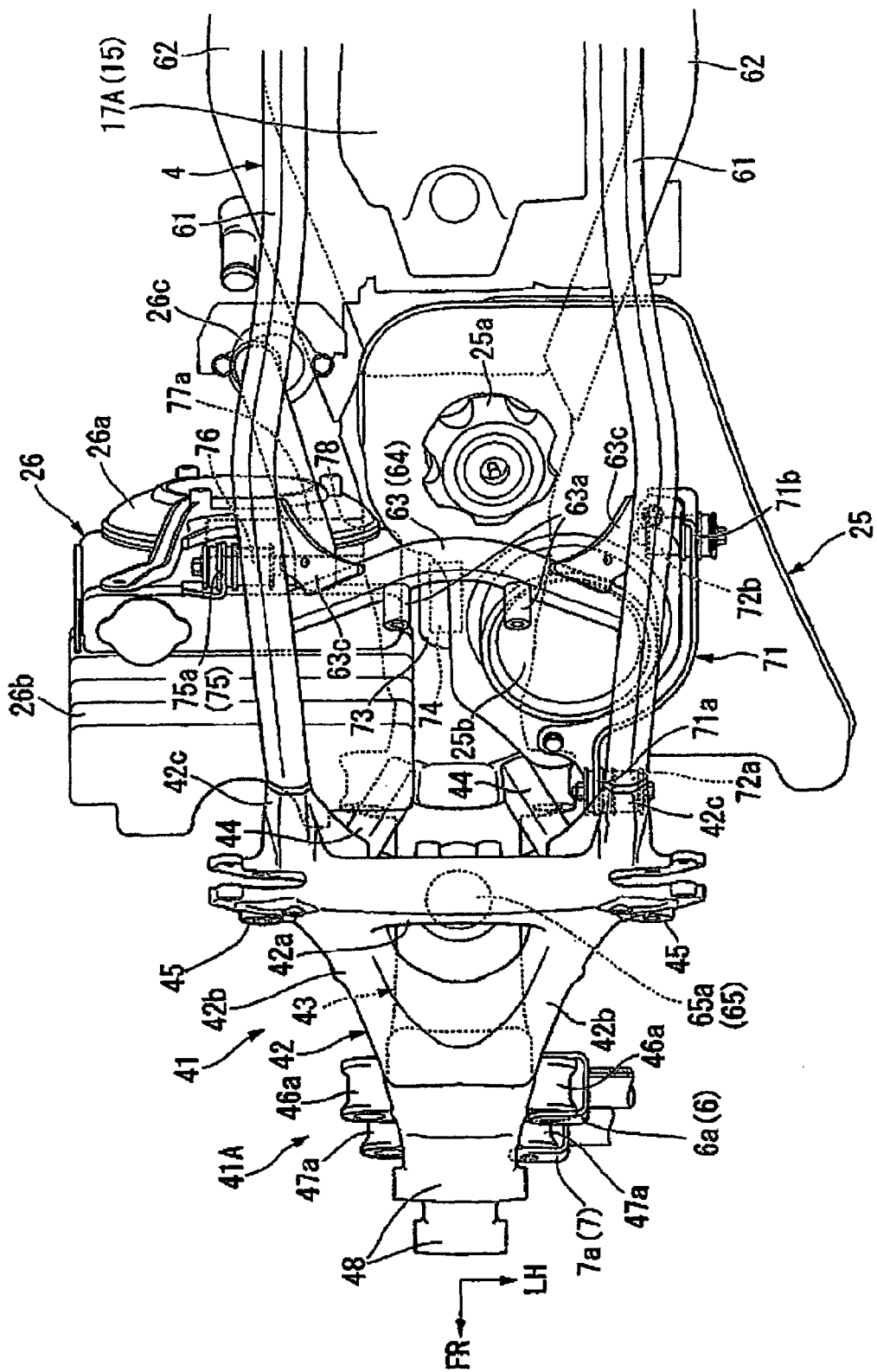
FIG. 6 is a top view of a main configuration of the front part of the vehicle body of the saddle-type vehicle.

As shown in FIGS. 5 and 6, the fuel tank 25 is provided in a way that it is surrounded by the front half of the upper beam part 43a, the gusset pipes 44, and the front halves of the respective upper connecting pipes 61 when viewed from the side. The fuel tank 25 is arranged off the center of the vehicle body in a way that the fuel tank 25 as a whole is positioned virtually on the left side of the vehicle body when viewed from the above, and is provided in a way that the left side part of the fuel tank 25 projects out leftward of the left upper connecting pipe 61 (out leftward of the vehicle body frame 4). Incidentally, in the drawings, reference numeral 25a denotes a fuel cap attached to a fuel filler arranged in a rear top end part of the fuel tank 25; and reference numeral 25b denotes a pump holder which is attached to an opening arranged in a front top end part of the fuel tank 25, and which supports a fuel pump in the fuel tank 25.

A front top surface of the fuel tank 25 is formed in a flat shape descending frontward, and an upper tank supporting bracket 71 is attached to the top surface. The upper tank supporting bracket 71 curves counterclockwise from a location in front of the pump holder 25b around the pump holder 25b, and is made of a metal. A plate-shaped front supporting flange 71a, which extends in a direction orthogonal to the right-left direction, is provided upright to a front part of the upper tank supporting bracket 71, whereas a plate-shaped rear supporting flange 71b, which extends in the direction orthogonal to the right-left direction, is provided upright to a rear part of the upper tank supporting bracket 71. A front upper tank supporting part 72a corresponding to the front supporting flange 71a is provided to a rear side of a left top end part of the upper front frame 42, whereas a rear tank supporting part 72b corresponding to the rear supporting flange 71b is provided to a lower side of a front part of the left upper connecting pipe 61. The front upper tank supporting part 72a and the rear upper tank supporting part 72b constitute the respective boss parts extending in the right-left direction. The front supporting flange 71a is arranged in the inner side of its corresponding boss part in the right-left direction, and is connected to the boss part by bolt fastening with a rubber bush or the like interposed in between. The rear supporting flange 71b is arranged in the outer side of its corresponding boss part in the right-left direction, and is connected to the boss part by bolt fastening with a rubber bush or the like interposed in between. Thereby, the upper part of the fuel tank 25 is elastically supported by the front frame assembly 41 and the left upper connecting pipe 61.

On the other hand, a bottom part of the fuel tank 25 is provided with a tank supporting leg 73 which extends along a top surface of the rear half of the upper beam part 43a. A lower tank supporting part 74 is provided in a concave manner to a location in the top surface of the rear half part of the upper beam part 43a, which location is opposed to the tank supporting leg 73. Thus, the tank supporting leg 73 is fitted into the lower tank supporting part 74 with a rubber damper or the like interposed in between. Thereby, the lower part of the fuel tank 25 is elastically supported by the front frame assembly 41.

Figure 7:
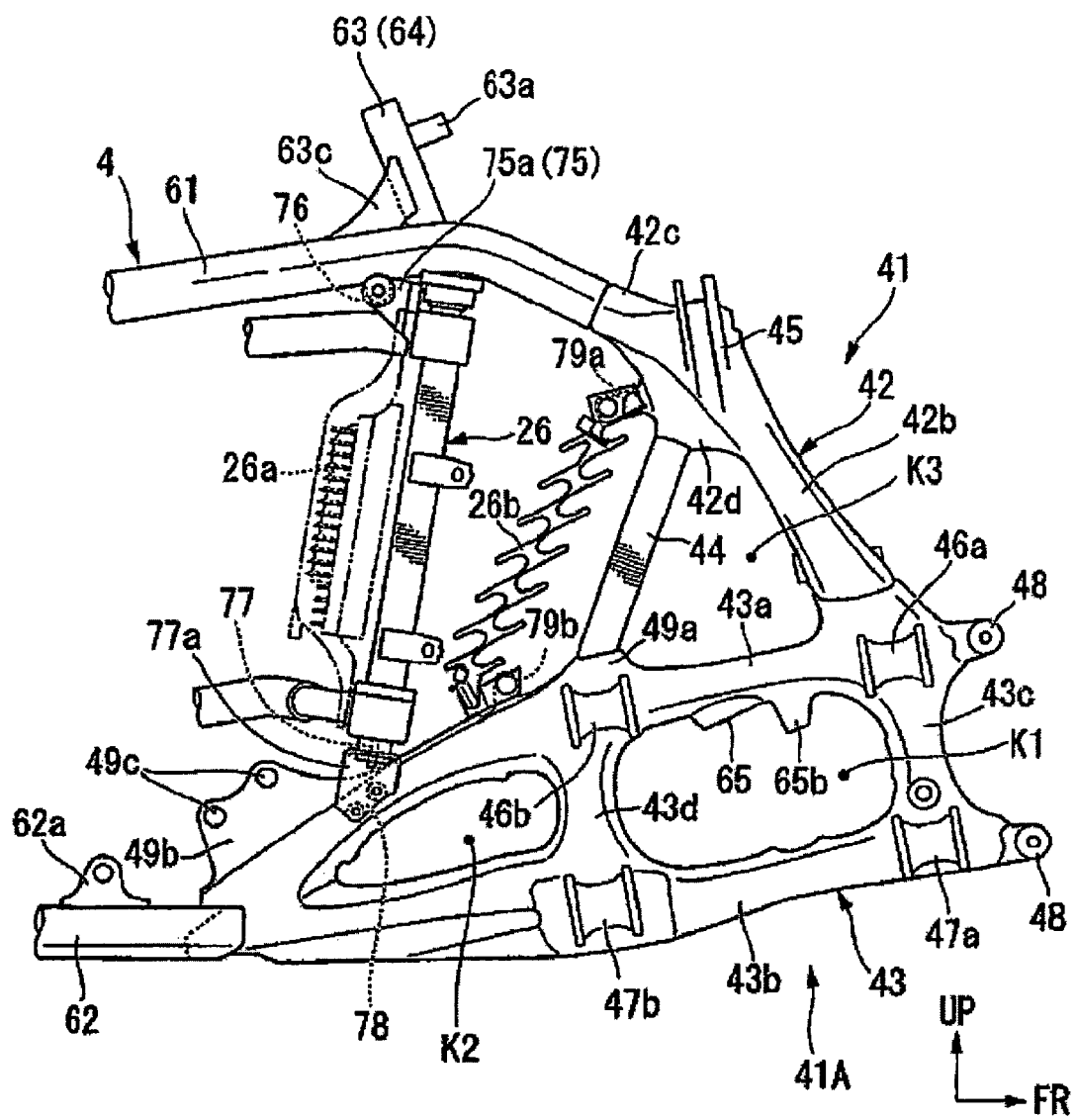
FIG. 7 is a right side view of the main configuration of the front part of the vehicle body of the saddle-type vehicle.

As shown in FIG. 7 in addition to FIGS. 5 and 6, the radiator 26 is shaped like a plate which extends in the right-left direction, and is slightly out of upright frontward. In addition, the radiator 26 is provided there to overlap the fuel tank 25 when viewed from the side. The radiator 26 is arranged off the center of the vehicle body to be positioned on the right side of the vehicle body when viewed from the above, and is provided there in a way that the right side part of the radiator 26 projects out rightward of the right upper connecting pipe 61 (out rightward of the vehicle body frame 4). Incidentally, in the drawings, reference numeral 26a denotes a radiator fan attached to a rear surface of the radiator 26; reference numeral 26b denotes a resin-made radiator grill arranged in a front side of the radiator 26; and reference numeral 26c denotes a thermostat arranged at a location leftward in front of the cylinder 17A of the engine 15.

An upper radiator supporting bracket 75, which is bent into the form of a letter L when viewed from the above, is attached to a rear surface of an upper tank of the radiator 26. The upper radiator supporting bracket 75 constitutes a supporting flange 75a which extends in a direction orthogonal to the right-left direction. An upper radiator supporting part 76 corresponding to the supporting flange 75a is provided to a lower side of the front part of the right upper connecting pipe 61. The upper radiator supporting part 76 constitutes a boss part extending in the right-left direction. The supporting flange 75a is arranged in an outer side of the boss part in the right direction, and thus the supporting flange 75a and the boss part are connected to each other by bolt fastening with a rubber bush or the like interposed in between. Thereby, an upper part of the radiator 26 is elastically supported by the right upper connecting pipe 61.

On the other hand, a bottom surface of a lower tank of the radiator 26 is provided with a pair of engagement parts 77 each shaped like a bar, for example. Lower radiator supporting brackets 77a corresponding to the engagement parts 77 are attached to a lower radiator supporting part 78 provided in a right side of the rear half of the upper beam part 43a. The lower radiator supporting brackets 77a protrude rightward of the lower radiator supporting part 78. The engagement parts 77 engage with protruding parts of the lower radiator supporting bracket 77a with rubber bushes or the like interposed in between, respectively. Thereby, a lower part of the radiator 26 is elastically supported by the front frame assembly 41.

It should be noted that the radiator grill 26b is arranged to tilt frontward so that its gradient is steeper than that of the radiator 26. A top end part of the radiator 26b engages with an upper grill supporting part 79a provided to a rear side of a right top end part of the upper front frame 42, whereas a bottom end part of the radiator 26b engages with a lower grill supporting part 79b provided to a right upper side of the rear half of the upper beam part 43a. Thereby, the radiator grill 26b is supported by the front frame assembly 41.

As described above, the vehicle body frame structure according to the foregoing example is applied to the saddle-type vehicle 1 including the paired right and left front wheels 2. The vehicle body frame structure includes the front frame assembly 41 having the front suspension supporting section 41A for supporting the left and right front wheels. The front suspension supporting section 41A is configured of the paired right and left cushion top end supporting parts 45, the paired right and left upper arm supporting parts 46a, the paired right and left upper arm supporting parts 46b, the paired right and left lower arm supporting parts 47a and the paired right and left lower arm supporting parts 47b. The front frame assembly 41 has the configuration which is bisected chiefly into the upper front frame 42 and the lower front frame 43. The upper front frame 42 includes the right and left cushion top end supporting parts 45. The lower front frame 43 includes the right and left upper arm supporting parts 46a, the right and left upper arm supporting parts 46b, the right and left lower arm supporting parts 47a, and the right and left lower arm supporting parts 47b.

This configuration makes it possible to construct the individual components in a smaller size without increasing the number of components constituting the frame, by providing the upper front frame 42, including the right and left cushion top end supporting parts 45 which are separated from each other progressively widely toward their top ends, as a member separated from the lower front frame 43 including the right and left upper arm supporting parts 46a, the right and left upper arm supporting parts 46b, the right and left lower arm supporting part 47a, and the right and left lower arm supporting part 47b. In addition, because the right and left cushion top end supporting parts 45 are provided to the upper front frame 42 formed in an integrated manner, and because the right and left upper arm supporting parts 46a, the right and left upper arm supporting parts 46b, the right and left lower arm supporting parts 47a and the right and left lower arm supporting parts 47b are provided to the lower front frame part 43 formed in an integrated manner, the precision with which the right and left parts of the front suspension supporting section 41A are constructed can be easily managed, and the number of steps needed to manufacture the frame can be reduced.

In addition, in the case of the foregoing vehicle body frame structure, the lower front frame 43 includes the upper beam part 43a which has the right and left upper arm supporting parts 46a and the right and left upper arm supporting parts 46b, and which extends in the front-rear direction, and the lower beam part 43b which has the right and left lower arm supporting parts 47a and the right and left lower arm supporting parts 47b, and which extends in the front-rear direction. In addition, the upper beam part 43a and the lower beam part 43b are partially connected to each other with the front and rear columnar parts 43c and 43d interposed in between. Accordingly, the foregoing vehicle body frame structure makes it possible to construct the light-weight lower front frame 43 while securing the rigidity for the lower front frame 43.

Furthermore, in the case of the foregoing vehicle body frame structure, the front frame assembly 41 is provided with the front engine supporting part 49c, the lower steering supporting part 65, the front upper tank supporting part 72a, the lower tank supporting part 74, and the lower radiator supporting part 78. Accordingly, the foregoing vehicle body frame structure makes it possible to simplify the structure for supporting the parts.

Figure 8:
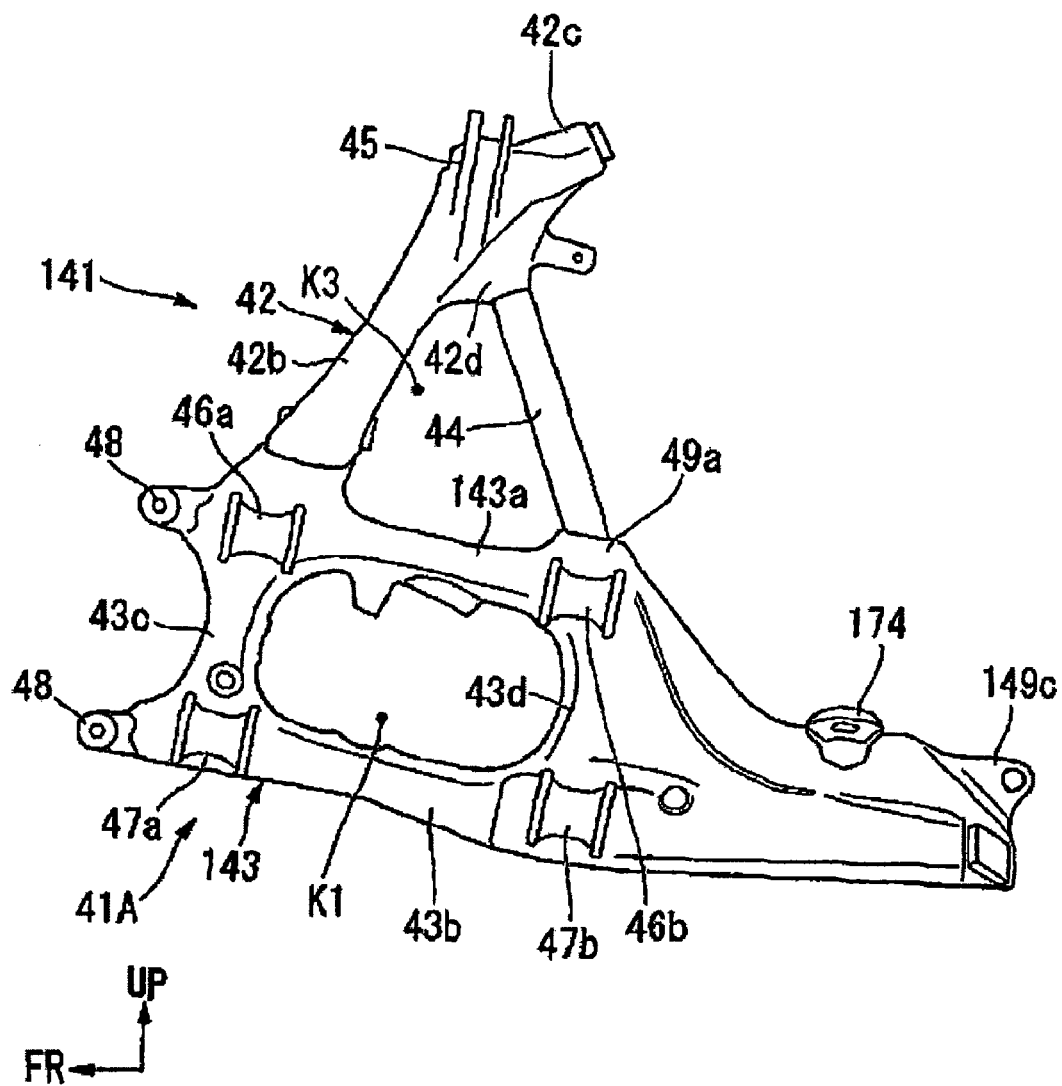
FIG. 8 is a left side view showing a modification of the front frame assembly.
Figure 9:
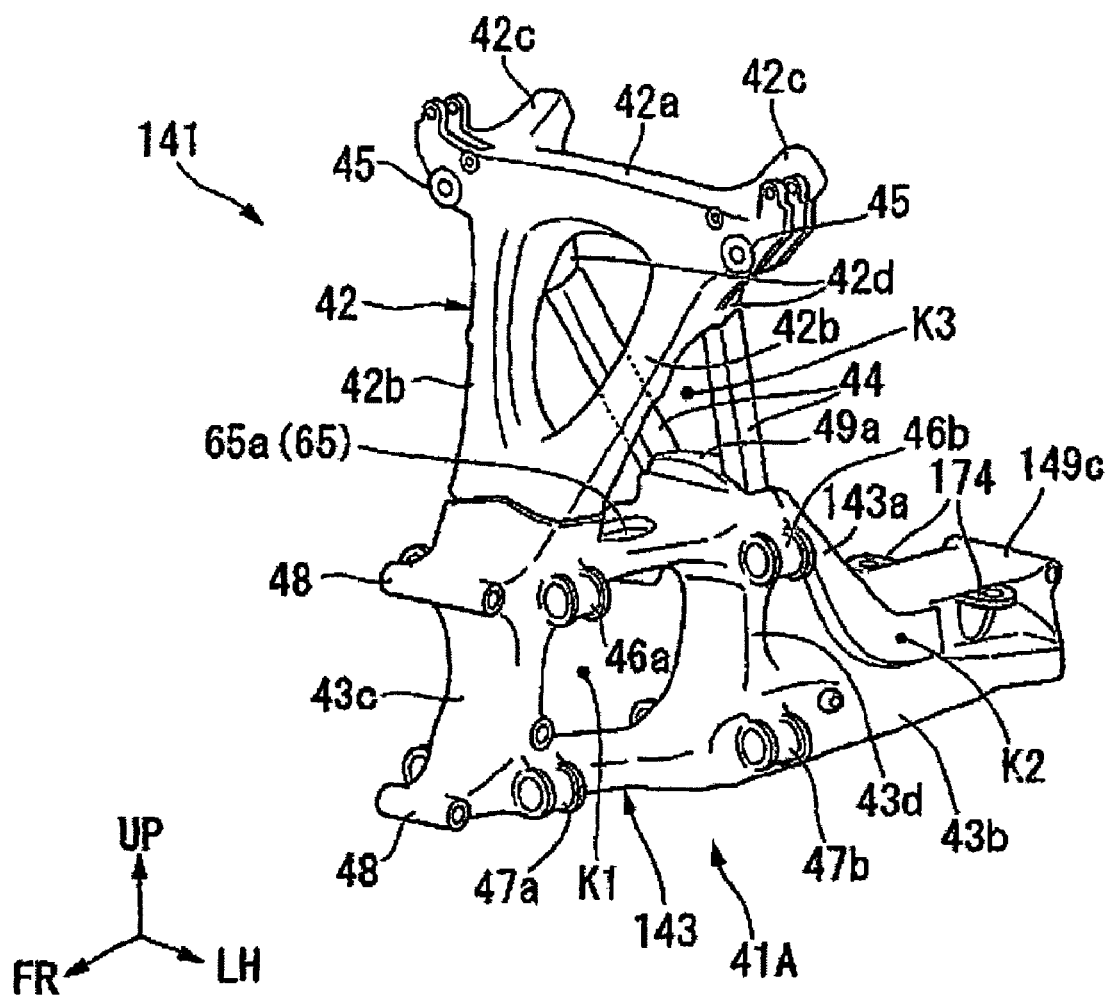
FIG. 9 is a perspective view of the front frame assembly shown in FIG. 8, which is viewed from a left front upper side.

It should be noted that the present invention is not limited to the foregoing example. The front frame assembly 41 may be replaced, for example, with a front frame assembly 141 shown in FIGS. 8 and 9. Hereinafter, same reference numerals are given to the same parts as in the foregoing example, and the descriptions thereof will be omitted.

The front frame assembly 141 is different from the front frame assembly 41 chiefly in that the front frame assembly 141 includes a lower front frame 143 instead of the lower front frame 43. Furthermore, the lower front frame 143 is formed of a monolithic cast aluminum part (or a monolithic forged aluminum part). As a result, the lower front frame 143 is different from the lower front frame 43 chiefly in that the lower front frame 143 includes an upper beam part 143a instead of the upper beam part 43a.

A rear half of the upper beam part 143a is curved to be concave downward when viewed from the side, and thus the rear half thereof and the rear half of the lower beam part 43b are integrated into a single unit. This eliminates the rear space part K2. Incidentally, reference numeral 149c in the drawing denotes a front engine supporting part for supporting the front part of the engine 15 by use of an engine supporting plate (not illustrated); and reference numeral 174 denotes a lower tank supporting part for supporting the lower part of the fuel tank (not illustrated).

Moreover, the vehicle body frame structure may have a configuration in which parts equivalent to the gusset pipes 44 are integrated with the upper front frame 42a into a single unit. In addition, the vehicle body frame structure may be applied to a vehicle body frame formed of metallic materials other than aluminum alloys.

Furthermore, in a case of a configuration having a frame structure body in which the right and left rear wheels 3 are supported by use of independent rear suspensions, and in which a rear part of the vehicle body frame includes a rear suspension supporting section for supporting the respective right and left rear wheels (or right and left cushion top end supporting parts, right and left upper arm supporting parts, and right and left lower arm supporting parts), a block structure similar to that employed for the front frame assembly 41 may be applied to the frame structure body, that is, the rear part of the vehicle body frame.

The configuration according to the foregoing example is only an example of the present invention. It is a matter of course that the present invention is applicable to vehicles each having three wheels or more than four wheels, or to vehicles (including a scooter-type vehicle) other than the saddle-type vehicle. It goes without saying that various modifications can be made without departing from the spirit of the present invention.

Although a specific form of embodiment of the instant invention has been described above and illustrated in the accompanying drawings in order to be more clearly understood, the above description is made by way of example and not as a limitation of the scope of the instant invention. It is contemplated that various modifications apparent to one of ordinary skill in the art could be made without departing from the scope of the invention which is to be determined by the following claims.

I claim:

1. A vehicle body frame structure for a vehicle having paired right and left wheels, comprising:
    a frame structure body comprising a suspension supporting section for supporting the right and left wheels, said suspension supporting section including paired right and left cushion top end supporting parts, paired right and left upper arm supporting parts, and paired right and left lower arm supporting parts,
    wherein said frame structure body is vertically bisected into an upper frame component comprising said right and left cushion top end supporting parts, and a lower frame component comprising said right and left upper arm supporting parts and said right and left lower arm supporting parts, and
    wherein said frame structure body is a monolithic cast or forged part,
    wherein said lower frame component comprises
        an upper beam part which comprises said right and left upper arm supporting parts and which extends in a front-rear direction; and
        a lower beam part which comprises said right and left lower arm supporting parts and which extends in a front-rear direction, and
    wherein said upper and lower beam parts are partially connected to each other by a single front columnar part and a single rear columnar part.

2. The vehicle body frame structure as recited in claim 1, wherein said frame structure body includes an engine supporting part.

3. The vehicle body frame structure as recited in claim 1, wherein said frame structure body includes a steering supporting part.

4. The vehicle body frame structure as recited in claim 1, wherein said frame structure body includes vehicle accessory supporting parts.

5. The vehicle body frame structure as recited in claim 1, wherein a front space part is formed between front halves of respectively of said upper beam part and said lower beam part.

6. The vehicle body frame structure as recited in claim 1, wherein each of said upper beam part and said lower beam part extends in the front-rear direction and is formed in a flat shape having a left-right width which is larger than a top-bottom thickness.

* * * * *